Sept. 12, 1950        F. J. DITTER        2,522,350

AIRCRAFT SKI WITH ADAPTABLE MOUNTING BUSHING

Filed Sept. 16, 1947

INVENTOR
FRANCIS J. DITTER
BY Anthony A. Juettner
ATTY.

UNITED STATES PATENT OFFICE 2,522,350

AIRCRAFT SKI WITH ADAPTABLE MOUNTING BUSHING

Francis J. Ditter, Minneapolis, Minn.

Application September 16, 1947, Serial No. 774,211

4 Claims. (Cl. 244—108)

The present invention relates to an aircraft ski and more particularly to a means for mounting such ski on the conventional landing wheel shaft of an airplane.

Aircraft skis are generally composed of a lower surface for contact with the ground, and have some type of pedestal intermediate the length of the landing surface for mounting the ski on the aircraft. This pedestal commonly contains a pair of concentric transverse tubes, the inner and outer tubes being separated by a sleeve of resilient material such as rubber. The wheel shaft of the airplane passes through the inner tube and the ski is thus attached to the airplane. The resilient bushing serves the purpose of providing a certain degree of resilience, while at the same time making the installation sufficiently rigid to function satisfactorily. Heretofore it has been common to either bond the rubber bushing to the inner and outer tube, or to force it in under high pressure such that the compression of the rubber creates sufficient friction between the inner and outer tubes as to form a unitary structure. Both of these methods have involved definite disadvantages as will be seen hereinafter.

As will be appreciated, various types of aircraft have different types of landing wheels, and accordingly have different types of shafts on which such landing wheels are mounted. Since the aircraft ski is substituted for the landing wheel, it will be apparent that heretofore it has been necessary to provide a wide variety of complete ski structures, each of which is suitable for installation on a particular type of airplane. This has necessitated the maintenance in stock of a large inventory of numerous models. It has now been discovered that by means of the present invention it is possible to make a single type of airplane ski, and that by the provision of a few types of mounting adapters it is possible to permit that single ski to be mounted on the wheel shaft of practically any airplane of the same general size.

It is, therefore, an object of the present invention, to provide a novel aircraft ski capable of being mounted on a number of different wheel shafts of airplanes.

It is another object of the present invention to provide a novel aircraft ski mounting which is universally adapted for mounting on a large variety of landing wheel shafts.

Figure 1:
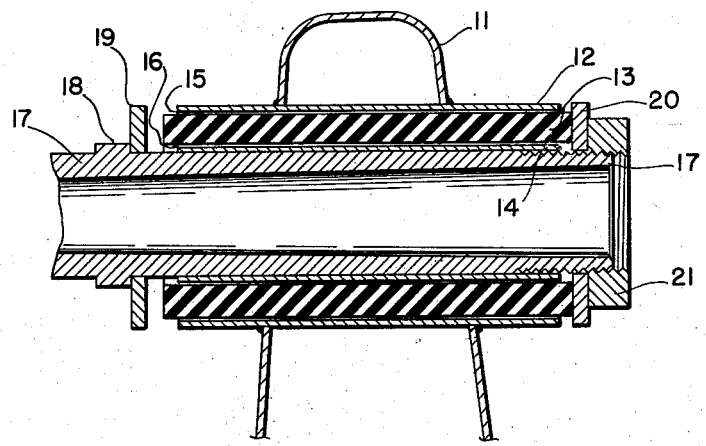
Figure 2:
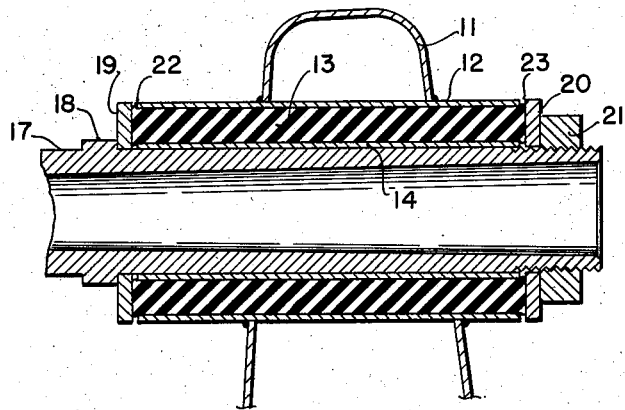
Figure 3:
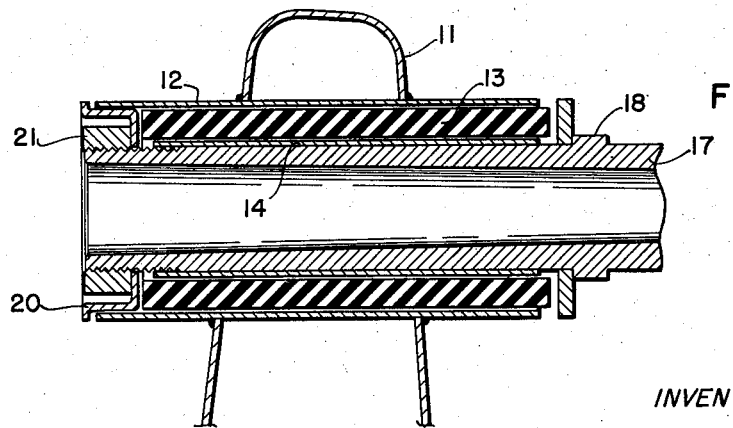

These and other objects of the present invention will be more fully apparent from the following description thereof, with particular reference to the drawings in which Figure 1 represents a longitudinal cross-section through the landing wheel shaft and the mounting tubes of the aircraft ski. This figure shows the parts of the mounting in the condition in which they are in the partially mounted condition;

Fig. 2 is a figure similar to Figure 1 with the exception that the mounting has been completed; and Fig. 3 illustrates a modification showing how the installation may be varied with different types of wheel shafts.

The invention is applicable to aircraft skis in general, and may be used on the skis described and claimed in my co-pending application, Serial No. 706,883, filed October 31, 1946. Referring particularly to Figure 1, the pedestal of the ski is generally indicated at 11 and has a transverse outer tube 12 passing therethrough. This outer tube is suitably fastened to the pedestal, as for example by welding. A rubber bushing 13 is positioned between the outer tube 12 and an inner tube 14. It should be noted that the rubber bushing 13 is longer than the tubes 12 and 14 for a purpose which will be pointed out hereinafter. Moreover the thickness of the bushing 13 is such that it may be freely inserted between the inner and outer tubes as is indicated by the spaces 15 and 16, which, for the purpose of illustration, are exaggerated somewhat. Wheel shaft 17 has a shoulder 18 against which retaining washer 19 abuts. A second retaining washer 20 at the outer end of the wheel shaft bears against the outer end of the rubber bushing. The outer end of the wheel shaft is threaded and the assembly is retained on the shaft by means of nut 21.

In assembling, the inner tube and the rubber bushing may be inserted in the outer tube of the pedestal and the assembly thus slipped on to the wheel shaft. Thereafter retaining washer 20 and nut 21 are applied and the assembly tightened. As the nut 21 is tightened, the rubber bushing is compressed between the two retaining washers and thus expands so as to form a tight fit between the inner and outer tubes and thus form a resilient but relatively rigid assembly. The condition of the rubber in the compressed form is illustrated in Fig. 2.

A further advantage of the present invention involves the fact that by this means it is also possible to provide means for continually maintaining the assembly in a snug fit. This may be accomplished by providing a rubber bushing of a length greater than that which is necessary for providing a tight fit at the time of first application. It is not necessary, therefore, that the nut 21 be tightened to such an extent that the retaining washers 19 and 20 are actually drawn up to contact the ends of the inner and outer tubes 12 and 14. A sufficiently tight fit may be obtained by compressing to the point where there is still some slight distance between the retaining washers and the end of the inner and outer tubes. These spaces are indicated at 22 and 23 in Fig. 2. This provides further take-up space to tighten the assembly after it has been in use for a sufficiently long time for a certain amount of wear to have occurred. By this means it is possible to provide an assembly which may constantly be maintained in a tight condition despite wear during use. This is an advantage which was not obtainable with prior methods of mounting.

It should be pointed out that while this assembly provides the required combination of resilience and tightness, the entire ski structure may be rotated about tube 14 on the wheel shaft. Such rotation is necessary in view of the relative movement which the ski makes as a result of the movement of the plane over slightly uneven landing and take-off surfaces.

It is apparent that this is an installation which may readily be made in the field by the average mechanic and without any special tools. In order to adapt this assembly to different wheel shafts, it is merely necessary to provide different inner tubes and rubber bushings and perhaps different retaining washers, spacers, and the like. It is thus possible for a manufacturer of skis to have in stock a single type of ski for aircraft of a particular size, and to fill orders for any particular aircraft by supplying standard skis and the particular mounting parts necessary for that particular installation.

In Fig. 3 there is illustrated a modification of the invention for adaption of the ski to a different wheel shaft. In general the wheel shaft is the same as that in Figure 1, with the exception that the distance between the shoulder 18 and nut 21 is somewhat shorter. For this particular installation the manufacturer supplies a shorter inner tube 14 and a shorter bushing 13, together with a cup-shaped retaining washer 20. It will be seen that the length of the rubber bushing 13 is longer than the inner tube and it is thus possible to compress the rubber bushing to form a tight fit between the inner and outer tubes.

Numerous other variations are possible in this mounting, all taking advantage of the novel feature of utilizing a rubber bushing which in its unstressed condition is of insufficient thickness to form a tight fit, and then compressing the bushing in place to such a degree that the thickness is increased and the desired tight fit is obtained. These variations may include novel shaped retaining washers, inner tubes, rubber bushings, spacers, and the like, all of which will readily suggest themselves to those skilled in the art from the previous description of the invention.

While various modifications of the invention have been described, it will be apparent that the invention is not limited thereto, but may be varied within the scope of the following claims.

I claim as my invention:

1. In an aircraft ski comprising a landing member, a pedestal mounted on said landing member intermediate the ends thereof, and a transverse outer tube through said pedestal, the combination therewith of an elastic bushing inside said transverse tube and an inner tube inside said elastic bushing, said elastic bushing having a wall thickness such that it may readily be inserted between the inner tube and the outer tube, and means for compressing said elastic bushing longitudinally to form a tight fit between the outer tube and the inner tube.

2. In an aircraft ski comprising a landing member, a pedestal mounted on said landing member intermediate the ends thereof, and a transverse outer tube through said pedestal, the combination therewith of an elastic bushing inside said transverse tube and an inner tube inside said elastic bushing, a pair of retaining washers, one disposed at each end of said outer tube, said elastic bushing having a wall thickness such that it may readily be inserted between the inner tube and the outer tube, and a length such that the retaining washers bear on the ends of the elastic bushing before they bear on the ends of said tubes, and means for applying pressure to said washers to compress said elastic bushing longitudinally.

3. In an aircraft ski comprising a landing member, a pedestal mounted on said landing member intermediate the ends thereof, and a transverse outer tube through said pedestal, the combination therewith of an elastic bushing inside said transverse tube and an inner tube inside said elastic bushing, said elastic bushing having a wall thickness slightly less than the distance between said tubes and a length greater than said tubes, a pair of retaining washers, one disposed at each end of said elastic bushing and means for applying pressure to said washers to compress said elastic bushing longitudinally.

4. In an aircraft ski comprising a landing member, a pedestal mounted on said landing member intermediate the ends thereof, and a transverse outer tube through said pedestal, the combination therewith of an elastic bushing inside said transverse tube and an inner tube inside said elastic bushing, said inner tube and said elastic bushing being shorter than said outer tube, and said elastic bushing having a wall thickness slightly less than the distance between said tubes, a pair of retaining washers, one disposed at each end of said outer tube, at least one of said washers being cup-shaped and adapted to bear on the end of said elastic bushing before bearing on the end of said tubes, and means for applying pressure to said washers to compress said elastic bushing longitudinally.

FRANCIS J. DITTER.

REFERENCES CITED

The following references are of record in the file of this patent:

UNITED STATES PATENTS

| Number | Name | Date |
| --- | --- | --- |
| 1,698,808 | Adamtchik | Jan. 15, 1929 |
| 1,760,492 | Hall | May 27, 1930 |
| 1,892,064 | Markey | Dec. 27, 1932 |
| 2,290,011 | Bahr | July 14, 1942 |